(12) United States Patent
Yamanaka et al.

(10) Patent No.: US 7,678,004 B2
(45) Date of Patent: Mar. 16, 2010

(54) STEERING APPARATUS

(75) Inventors: Kosuke Yamanaka, Kashiwara (JP); Shiro Nakano, Osaka (JP); Masami Naka, Yamatotakada (JP); Tomoyasu Kada, Kaiduka (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 270 days.

(21) Appl. No.: 11/369,932

(22) Filed: Mar. 8, 2006

(65) Prior Publication Data
US 2006/0205551 A1    Sep. 14, 2006

(30) Foreign Application Priority Data
Mar. 9, 2005    (JP) .............................. 2005-066197

(51) Int. Cl.
*B62D 11/06* (2006.01)
(52) U.S. Cl. ........................ 475/30; 475/151; 475/339
(58) Field of Classification Search .................. 475/30, 475/151, 338, 339
See application file for complete search history.

(56) References Cited

U.S. PATENT DOCUMENTS

| | | | | |
|---|---|---|---|---|
| 2,465,739 A | * | 3/1949 | McGill | 475/42 |
| 3,052,098 A | * | 9/1962 | Ebert | 60/492 |
| 4,751,976 A | | 6/1988 | Higuchi et al. | |
| 6,135,233 A | * | 10/2000 | Yamauchi | 180/443 |
| 6,159,124 A | * | 12/2000 | Redinger et al. | 475/131 |
| 6,213,242 B1 | * | 4/2001 | Rodrigues et al. | 180/249 |
| 6,461,265 B1 | * | 10/2002 | Graham et al. | 475/5 |
| 7,247,111 B2 | * | 7/2007 | Yamanaka et al. | 475/2 |

FOREIGN PATENT DOCUMENTS

| | | |
|---|---|---|
| EP | 1138576 A2 | 10/2001 |
| EP | 1693599 A | 8/2006 |
| JP | 61-122071 A | 6/1986 |
| JP | 61-122072 A | 6/1986 |
| JP | 61-122073 A | 6/1986 |
| JP | 61-122074 A | 6/1986 |
| JP | 61-122075 A | 6/1986 |
| JP | 61-122076 A | 6/1986 |
| JP | 61-122077 A | 6/1986 |

* cited by examiner

*Primary Examiner*—Ha D. Ho
(74) *Attorney, Agent, or Firm*—Birch, Stewart, Kolasch & Birch, LLP

(57) ABSTRACT

A rotation transmitting apparatus comprises a first sun gear joined to a first shaft so as to rotate interlockingly, a second shaft arranged to the first shaft coaxially, a second sun gear joined to the second shaft so as to rotate interlockingly, a first planetary gear meshed with the first sun gear, a second planetary gear rotating with the first planetary gear and meshed with the second sun gear, and a carrier supporting the first and second planetary gears and arranged to be driven by a differential electric motor. In particular, the number of teeth of each of the first and second sun gears and the first and second planetary gears is determined so that the ratio of a torque applied to the second shaft to a torque applied to the first shaft ranges from 1:0.7 to 1:0.9.

9 Claims, 10 Drawing Sheets

FIG. 2

| | FIRST SHAFT | | SECOND SHAFT | | SUPPLEMENTARY EXPLANATION |
|---|---|---|---|---|---|
| | ROTATIONAL SPEED r/min | TORQUE Nm | ROTATIONAL SPEED r/min | TORQUE Nm | |
| STEADY STEERING (GEAR RATIO 1.0) | 60 | 10 | 60 | 10 | ROTATIONAL SPEED OF SECOND SHAFT 1 TIME |
| STEERING OF GEAR RATIO 1.5 | 60 | 10 | 90 | 10 | ROTATIONAL SPEED OF SECOND SHAFT 1.5 TIMES |
| STEERING OF GEAR RATIO 2.0 | 60 | 10 | 120 | 10 | ROTATIONAL SPEED OF SECOND SHAFT 2 TIMES |
| ACTIVE STEERING 1 | 0 | 0 | 100 | 5 | STEERING WITHOUT HOLDING ONTO WHEEL |
| ACTIVE STEERING 2 | 100 | 5 | −100 | −5 | REVERSE ROTATION OF FIRST AND SECOND SHAFTS |
| AUTOMATIC PARKING STEERING | 0 | 0 | 60 | 10 | STEERING WITHOUT HOLDING ONTO WHEEL |

STEERING APPARATUS

CROSS-REFERENCE TO RELATED APPLICATIONS

This Nonprovisional application claims priority under 35 U.S.C. §119(a) on Patent Application No. 2005-66197 filed in Japan on Mar. 9, 2005, the entire contents of which are hereby incorporated by reference.

BACKGROUND OF THE INVENTION

1. Field of the Invention

The present invention relates to a rotation transmitting apparatus provided with a differential mechanism coupling a first shaft and a second shaft that are freely rotatable so that the shafts rotate interlocking with each other, and a differential actuator for driving the differential mechanism.

2. Description of the Related Art

A rotation transmitting apparatus provided with a differential mechanism is commonly used as the steering apparatus in a vehicle. The rotation transmitting apparatus as the steering apparatus includes a sun gear mounted on a first shaft joined to a steering wheel, planetary gears rotating on its axis while moves around the sun gear, an internal gear meshing with the planetary gears and mounted on a second shaft that is disposed coaxially with the first shaft and away from the sun gear, and a carrier rotatably fitted and mounted to the first shaft and supporting the planetary gears. By operating the steering wheel, the second shaft is rotated via the first shaft, the sun gear, the planetary gears, the carrier and the internal gear, so as to operate a steering mechanism connected to the second shaft (for example, as disclosed in Japanese Patent Application Laid-Open No. 61-122071 (1986)).

In a steering apparatus disclosed in Japanese Patent Application Laid-Open No. 61-122071 (1986), teeth are provided on an outer side of the carrier, and a differential electric motor having a driving gear meshing with the teeth of the carrier, and a controller for controlling a drive circuit of the electric motor in response to a steering angle of the steering wheel and a speed of the vehicle are provided. The steering apparatus is structured such that the carrier is rotated by driving the electric motor so as to have the second shaft rotate faster than the first shaft.

In addition to the apparatus disclosed in Japanese Patent Application Laid-Open No. 61-122071 (1986), another steering apparatus including the differential mechanism is known where a reaction force electric motor is provided for applying a desired torque to the first shaft in response to the torque applied to the second shaft. The reaction force electric motor is driven when the steering torque applied to the first shaft is deviated from its correct level, e.g., by the differential electric motor increasing the rotational speed of the second shaft. Thereby, a desired torque is applied to the first shaft in response to the torque applied to the second shaft, thus returning the steering torque to its correct level.

The actions of the steering apparatus having the differential mechanism and the two, differential and reaction force electric motors as the actuators may include the following.

(1) A steady steering in which a gear ratio B/A, of a gear A on the first shaft side and a gear B on the second shaft side in the differential mechanism, is set to 1.0, and the second shaft is rotated at a speed 1.0 times as fast as a rotational speed of the first shaft by rotating the first shaft manually so as to perform a steady steering.

(2) A gear ratio increased steering in which the gear ratio B/A is set to be greater than 1.0, and the second shaft is rotated at a speed more than 1.0 times as fast as a rotational speed of the first shaft by rotating the first shaft manually.

(3) An active steering 1 in which the second shaft is rotated by a differential electric motor instead of rotating the first shaft manually so as to perform a steering.

(4) An active steering 2 in which the first shaft is rotated manually, and the second shaft is rotated by a differential electric motor in a reverse direction of the rotation of the first shaft.

(5) An automatic parking in which the second shaft is rotated by a differential electric motor instead of rotating the first shaft manually so as to park automatically.

It is known that the steering action of the vehicle having the rotation transmitting apparatus disclosed in Japanese Patent Application Laid-Open No. 61-122071 (1986) is conducted as resisting a reaction force from the ground applied to the (generally front) vehicle wheels and the reaction force may be varied depending on the running speed of the vehicle and the steering angle of the steering wheel. Accordingly, the differential electric motor is controlled and driven to increase the rotational speed of the second shaft compared to the first shaft during the slow speed running or parking and minimize a difference in the rotational speed between the first shaft and the second shaft during the high speed running.

In the rotation transmitting apparatus having the differential mechanism, meanwhile, the rotational speed of the carrier and the rotational speed of the electric motor are largely affected by the ratio between the torque applied to the first shaft and the torque applied to the second shaft. However, the torque ratio may hardly be set to an optimum while adversely affecting the steering feeling, encouraging the generation of noises at the differential mechanism, and increasing the power consumption of the electric motor(s), thus requiring a favorable solution.

BRIEF SUMMARY OF THE INVENTION

The present invention has been made with the aim of solving the above problem and its object is to provide a rotation transmitting apparatus which is capable of ensuring a favorable steering feeling, attenuating the generation of noises at the differential mechanism, and decreasing the power consumption of the electric motor(s).

For achievement of the foregoing object, we, the applicants, have conducted a series of experiments with a rotation transmitting apparatus shown in FIG. 1 for examining the relationship of the torque ratio, the rotational speed of the carrier, the rotational speed of the differential electric motor, the torque on the reaction force electric motor, and the power consumption of the two, differential and reaction force electric motors at each of 1) the steady steering, (2) the gear ratio increased steering, (3) the active steering 1, (4) the active steering 2, and (5) the automatic parking using a steering condition shown in FIG. 2. The results are illustrated in FIGS. 3 to 6. More particularly, while FIG. 1 illustrates a schematic view of the rotation transmitting apparatus, FIG. 3 is a graph showing the relationship between the torque ratio and the rotational speed of the carrier, FIG. 4 is a graph showing the relationship between the torque ratio and the rotational speed of the differential electric motor, FIG. 5 is a graph showing the relationship between the torque ratio and the torque on the reaction force electric motor, and FIG. 6 is a graph showing the relationship between the torque ratio and the power consumption of the two electric motors.

Illustrated in FIG. 1 are a first sun gear 100 joined to a first shaft 101 so as to rotate interlockingly, a second sun gear 102 joined to a second shaft 103 so as to rotate interlockingly, a first planetary gear 104 meshed with the first sun gear 100, a second planetary gear 105 meshed with the second sun gear 102, a carrier 106 supporting the first and second planetary gears 104 and 105, an external toothed member 107 mounted on the periphery of the carrier 106, a differential electric motor 108 having a drive gear 109 mounted thereon to mesh with the external toothed member 107, an driven gear 110 mounted on the first shaft 100, and a reaction force electric motor 111 having a drive gear 112 mounted thereon to mesh with the driven gear 110. The action of the differential electric motor 108 is controlled and driven so that the ratio between the torque applied to the drive gear 112 and the torque applied to the driven gear 110 is 1/10 and the ratio between the torque applied to the drive gear 109 and the torque applied to the second shaft 103 is 1/10.

A rotation transmitting apparatus according to the first aspect is a rotation transmitting apparatus comprising a differential mechanism having a first shaft and a second shaft arranged so as to be freely rotatable and linked with each other so as to rotate interlockingly and an actuator for driving a part of the differential mechanism, characterized in that the differential mechanism is arranged to have the ratio of a torque applied to the second shaft to a torque applied to the first shaft ranging from 1:0.7 to 1:0.9.

A rotation transmitting apparatus according to the second aspect is characterised in that the differential mechanism includes a first sun gear joined to the first shaft so as to rotate interlockingly, a second sun gear joined to the second shaft so as to rotate interlockingly, a first planetary gear meshed with the first sun gear, a second planetary gear rotating with the first planetary gear and meshed with the second sun gear, and a carrier supporting the first and second planetary gears and arranged to be driven by the actuator, and the number of teeth of each of the first and second sun gears and the first and second planetary gears is determined so as to satisfy the torque ratio.

A rotation transmitting apparatus according to the third aspect is characterised by further comprising an actuator for applying a desired torque to the first shaft in response to the torque applied to the second shaft.

A rotation transmitting apparatus according to the fourth aspect is characterised in that the differential mechanism includes a sun gear arranged so as to be freely rotatable, an internal gear arranged on the periphery of the sun gear so as to be freely rotatable, planetary gears meshed with both the sun gear and the internal gear, and a carrier supporting the planetary gears, wherein one of the sun gear, the internal gear, and the carrier is joined to the first shaft so as to rotate interlockingly, another is joined to the second shaft so as to rotate interlockingly, and the other is joined to a movable portion of the actuator so as to rotate interlockingly while the number of teeth of each of the sun gear, the internal gear, and the planetary gears is determined so as to satisfy the torque ratio.

According to the first aspect, since the torque ratio between the second shaft and the first shaft in the differential mechanism ranges from 1:0.7 to 1:0.9, an optimal characteristic can be obtained from the three characteristics shown in FIGS. 3, 4, and 6. More specifically, the carrier in the differential mechanism can be rotated with less possibility of generating undesired noises, as shown in FIG. 3, hence minimizing the noise in the differential mechanism. Also, the differential actuator can be rotated at a relatively lower number of revolutions leading to a low speed, as shown in FIG. 4, thus increasing the torque applied to the second shaft. Since the differential actuator is controlled and driven not to rotate in a reverse direction, hence preventing the steering feeling from deteriorating by any unfavorable sense of motion. Moreover, the power consumption of the actuators can be decreased as shown in FIG. 5.

According to the second aspect, the torque ratio of the second shaft to the first shaft is set to range from 1:0.7 to 1:0.9 by the first and second sun gears and the first and second planetary gears in the differential mechanism, thus ensuring the same advantages as of the first aspect.

According to the third aspect, the first shaft can be applied by a desired reaction force torque in response to the torque applied to the second shaft when the torque applied to the first shaft is deviated by the rotational speed of the second shaft being increased compared to the first shaft, thus ensuring a favorable steering feeling. Also, the torque generated by the reaction force actuator can relatively be decreased as shown in FIG. 5, thus reducing the size of the reaction force actuator and thus reducing the overall dimensions of the rotation transmitting apparatus. Moreover, since the reaction force actuator is provided, an optimal characteristic can obtain from the four characteristics shown in FIGS. 3 to 6.

According to the fourth aspect, the torque ratio of the second shaft to the first shaft is set to range from 1:0.7 to 1:0.9 by the sun gear, the internal gear, and the planetary gears in the differential mechanism, thus ensuring the same advantages as of the first aspect.

The above and further objects and features of the present invention will more fully be apparent from the following detailed description with accompanying drawings.

BRIEF DESCRIPTION OF THE DRAWINGS

FIG. 2 is a list showing the steering conditions of the rotation transmitting apparatus shown in FIG. 1;

DETAILED DESCRIPTION OF THE INVENTION

The following description will explain in detail the present invention, based on the drawings illustrating some embodiments thereof.

Embodiment 1

Figure 7:
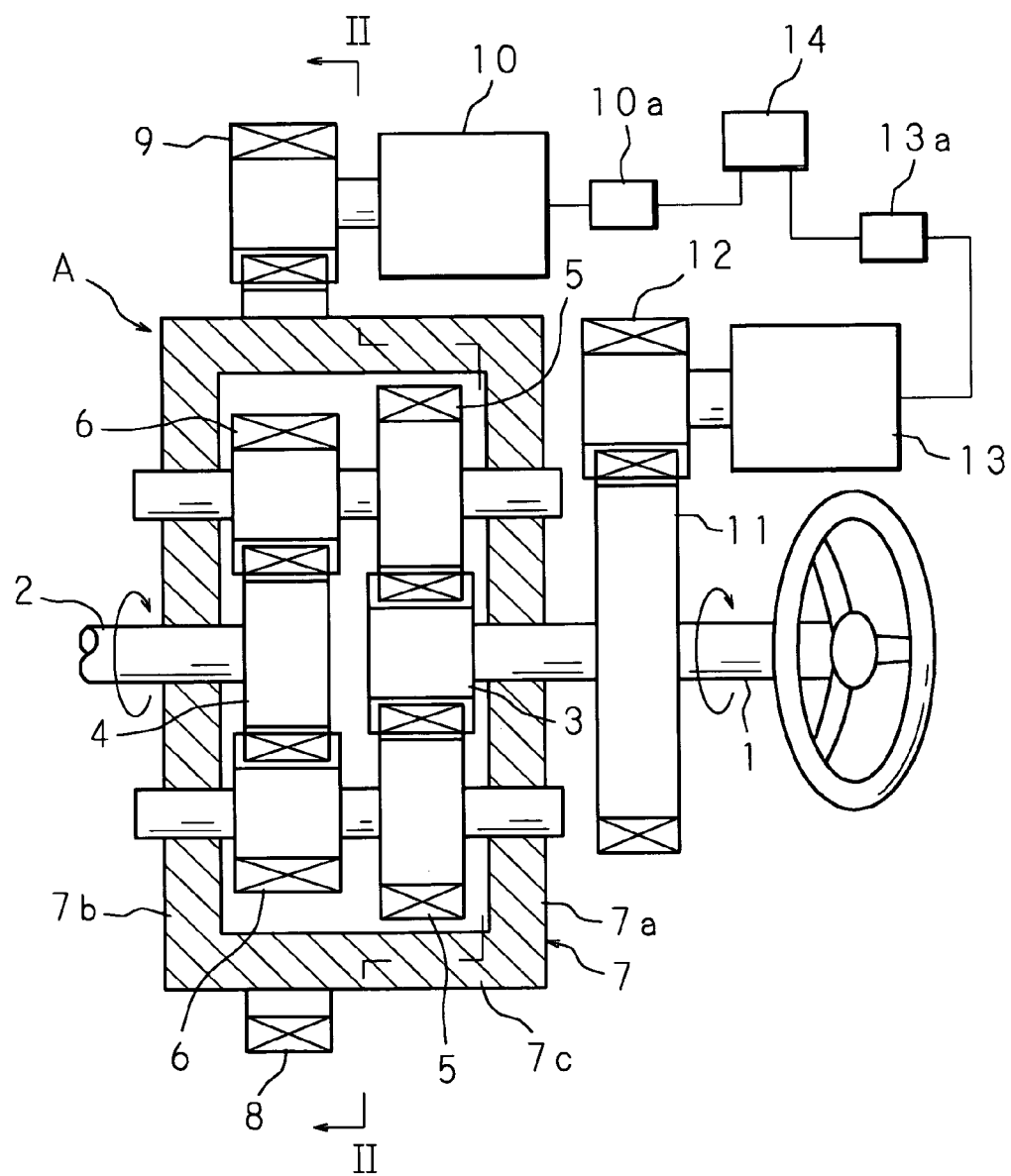
FIG. 7 is a schematic view showing a construction of a rotation transmitting apparatus according to Embodiment 1 of the present invention.
Figure 8:
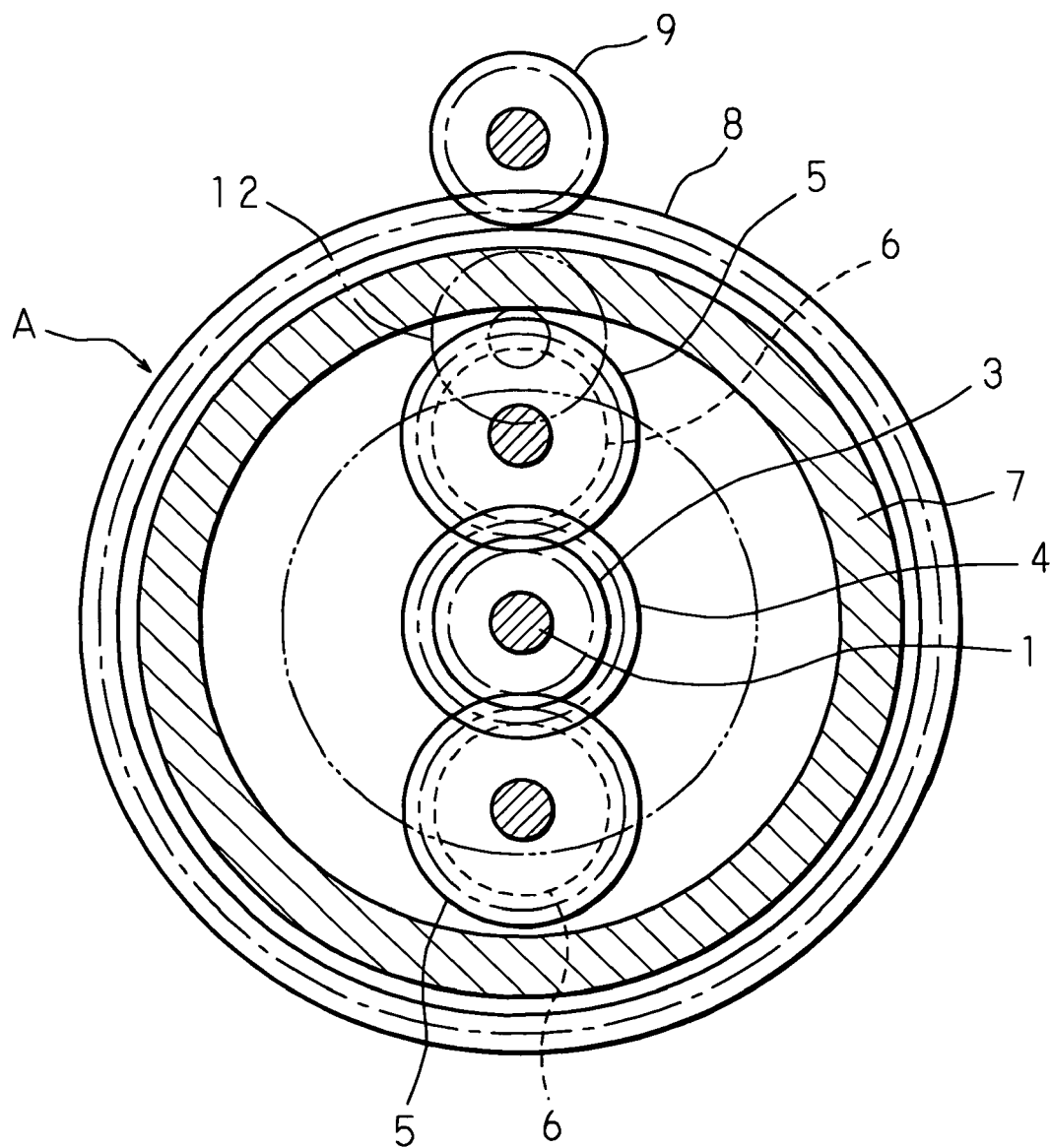
FIG. 8 is a cross sectional view taken along the line II-II of FIG. 7.

FIG. 7 is a schematic view showing a construction of a rotation transmitting apparatus according to Embodiment 1 of the present invention. FIG. 8 is a cross sectional view taken along the line II-II of FIG. 7.

The rotation transmitting apparatus comprises a differential gears mechanism A which includes a first shaft 1 and a second shaft 2 arranged coaxially so as to be freely rotatable, a first sun gear 3 coupled to the first shaft 1 coaxially so as to rotate interlockingly, a second sun gear 4 coupled to the second shaft 2 coaxially so as to rotate interlockingly, a plurality of first planetary gears 5 meshed with the first sun gear 3, a plurality of second planetary gears 6 rotating coaxially with the first planetary gears 5 and meshed with the second sun gear 4, and a carrier 7 supporting the first and second planetary gears 5 and 6, an external toothed member 8 mounted on the outer surface of the carrier 7, a differential electric motor 10 having a first drive gear 9 meshed with teeth of the external toothed member 8 and acting as an actuator for rotating the carrier 7, a transmission gear 11 mounted to an intermediate portion of the first shaft 1, and a reaction force electric motor 13 as a actuator having a second drive gear 12 meshed with the transmission gear 11 for applying a required torque force to the first shaft 1 in response to the torque applied to the second shaft 2 or in other words, for, when the steering torque applied to the first shaft 1 is deviated from its correct level, applying a reaction force torque in the same direction as a direction of the steering torque to the first shaft 1.

Both the first shaft 1 and the second shaft 2 are rotatably mounted through bearings to a stationary member and first and second sun gears 3 and 4 come opposite to each other along the same axis. A torque sensor is provided on the periphery of the first shaft 1 for detecting the torque applied to the first shaft 1 and a controller 14 is provided for controlling the action of drive circuits 10a and 13a of the differential electric motor 10 and the reaction force electric motor 13 respectively based on the torque detected by the torque sensor, or the like.

The carrier 7 includes a first plate portion 7a of a disc shape rotatably supportably fitted onto the outer surface of the first shaft 1, a second plate portion 7b of a disc shape rotatably supportably fitted onto the outer surface of the second shaft 2, and an annular joint portion 7c joining at the outer surface between the first plate portion 7a and the second plate portion 7b. The external toothed member 8 of an annular shape having a plurality of teeth is integrally mounted onto the outer surface of the annular joint portion 7c.

The first planetary gears 5 are uniformly allocated at a plurality of peripheral positions of the first plate portion 7a while the second planetary gears 6 are uniformly allocated at a plurality of peripheral positions of the second plate portion 7b. The first and second planetary gears 5 and 6 are mounted on both longitudinal ends of a single shaft member.

The first and second planetary gears 5 and 6 of the differential gears mechanism A and the first and second sun gears 3 and 4 all are constituted of spur gears. It is assumed that the number of teeth Z1 of the first sun gear 3 is 17, the number of teeth Z2 of the first planetary gear 5 is 15, the number of teeth Z3 of the second planetary gear 6 is 13, and the number of teeth Z4 of the second sun gear 4 is 19. When the rotating motion of the first shaft 1 is transmitted to the second shaft 2, the ratio of the torque applied to the second shaft 2 to the torque applied to the first shaft 1 is calculated from:

$$(Z1 \div Z2) \times (Z3 \div Z4).$$

Figure 1:
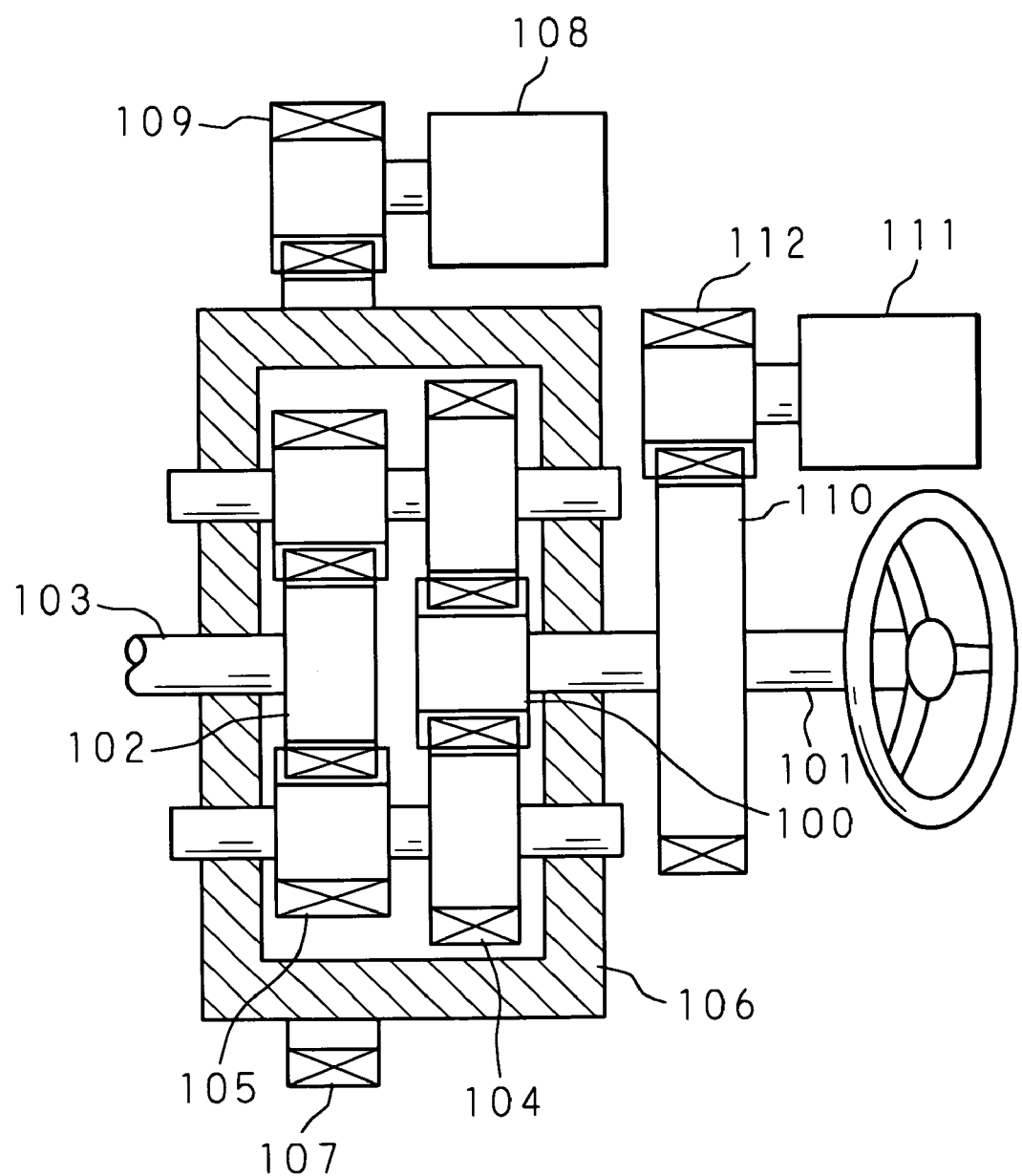
FIG. 1 is a schematic view of a rotation transmitting apparatus.
Figure 3:
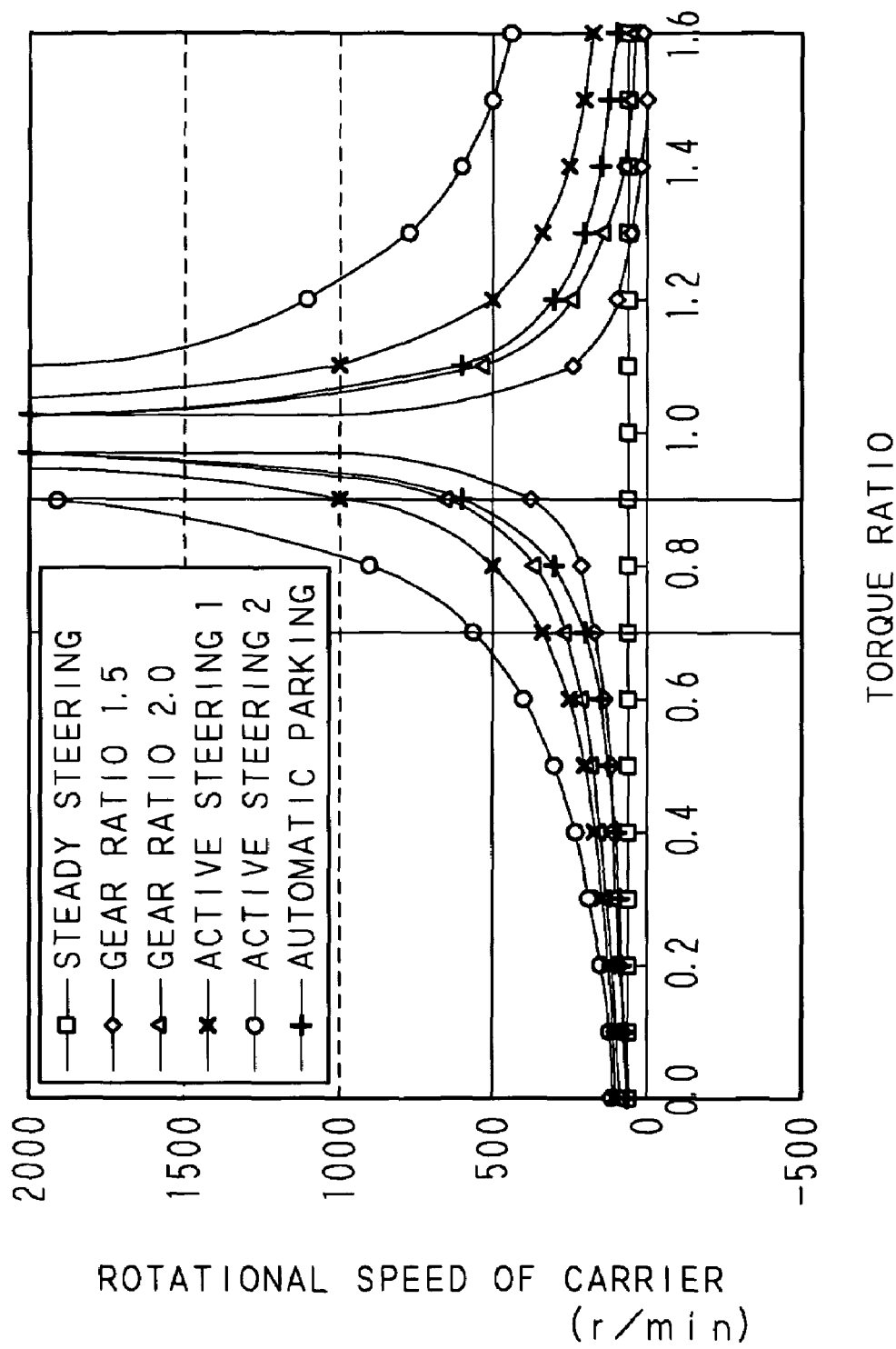
FIG. 3 is a graph showing the relationship between the torque ratio and the rotational speed of a carrier.

In particular, the torque ratio is set to range from 1:0.7 to 1:0.9, which can obtain an optimal characteristic from the four characteristics shown in FIGS. 3 to 6. Referring to FIG. 3, when the torque ratio exceeds 1:0.9, the rotational speed of the carrier 7 will be higher than 2000 r/min thus generating a noise sound easily due to the rotation of the carrier 7. When the torque ratio remains not higher than 1:0.9, the rotational speed of the carrier 7 is not higher than 2000 r/min and its generating noise sound in the differential gears mechanism will be attenuated.

Figure 4:
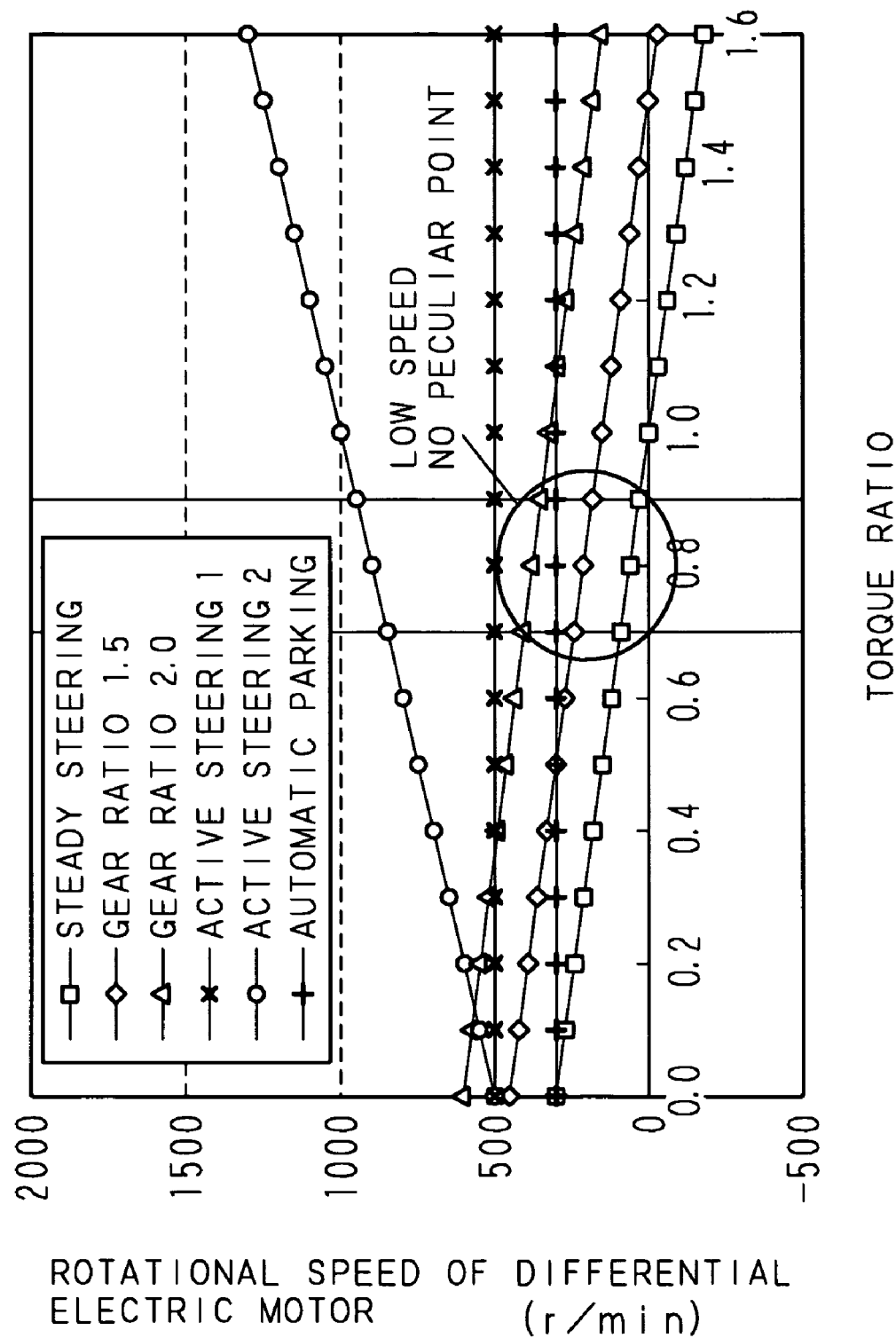
FIG. 4 is a graph showing the relationship between the torque ratio and the rotational speed of a differential electric motor.

Referring to FIG. 4, when the torque ratio is lower than 1:0.7, the rotational speed of the differential electric motor 10 will relatively increase thus deteriorating the operational response and increasing a noise sound. If the torque ratio exceeds 1:1.0, the differential electric motor 10 may rotate in a reverse direction during the gear-ratio variable steering action. Since the torque ratio is ranged from 1:0.7 to 1:0.9, the rotational speed of the differential electric motor 10 can relatively be lowered, the differential electric motor 10 can be driven while operated without its rotational direction reversed, hence preventing the steering feeling from deteriorating by any unfavorable sense of motion.

Figure 5:
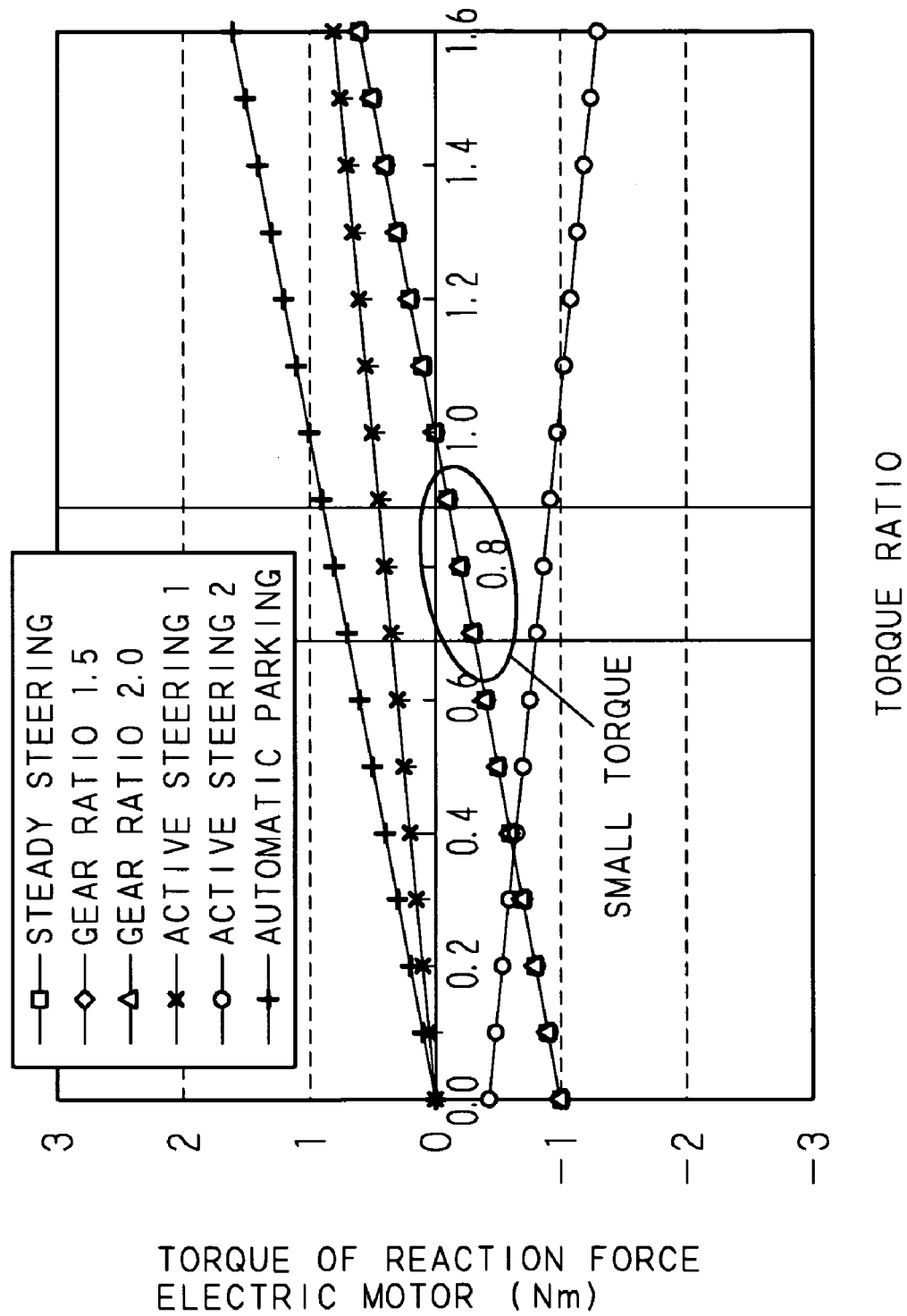
FIG. 5 is a graph showing the relationship between the torque ratio and the torque of a reaction force electric motor.

Referring to FIG. 5, when the torque ratio is ranged from 1:0.7 to 1:0.9, the reaction force electric motor 13 remains relatively low in the output torque thus improving the operational response and minimizing the generation of noise sounds.

Figure 6:
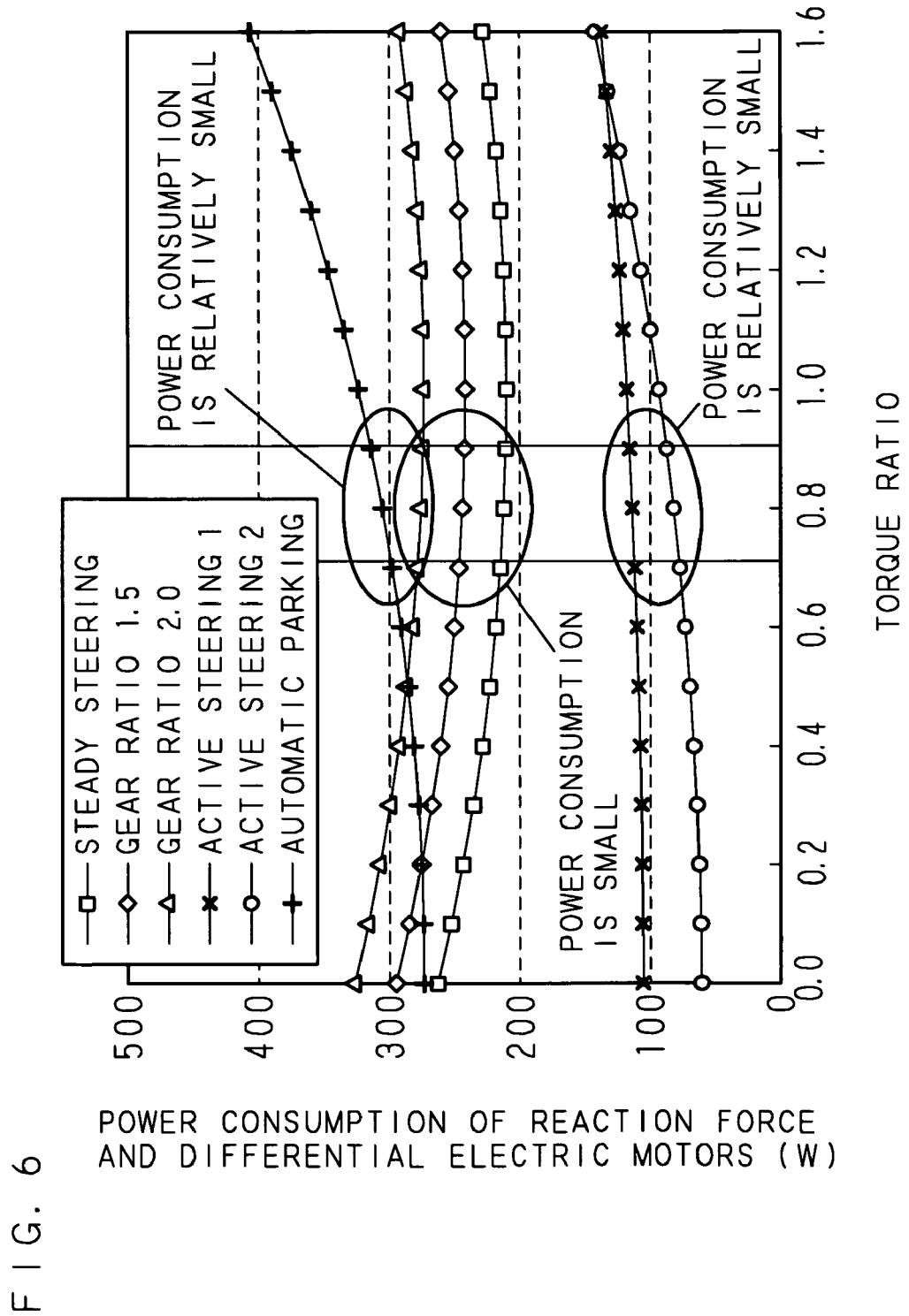
FIG. 6 is a graph showing the relationship between the torque ratio and the power consumption of the two, differential and reaction force electric motors.

Referring to FIG. 6, if the torque ratio is lower than 1:0.7 or higher than 1:0.9, both the differential electric motor 10 and the reaction force electric motor 13 will be relatively increased in the power consumption. Since the torque ratio remains in a range from 1:0.7 to 1:0.9, both the electric motors 10 and 13 can stay low in the output and thus be decreased in the power consumption.

As described, the rotation transmitting apparatus equipped with a differential gears mechanism A is commonly used as a steering apparatus in a vehicle. The steering apparatus is constructed in a manner such that the first shaft 1 is joined to the steering wheel of the vehicle, a steering mechanism includes a pinion gear and a rack shaft which is provided with a rack gear meshed with the pinion gear and which enables its movement in the axial direction, and the second shaft 2 is joined to the pinion gear in the steering mechanism so as to rotate interlockingly, thus conducting the action of steering control wheels mounted to both ends of the rack shaft.

In the action of the steering apparatus constructed as mentioned above, when the first shaft 1 is turned in one direction denoted by the arrow in FIG. 7 by the action of the steering wheel, its movement is transmitted via the first sun gear 3, the first and second planetary gears 5 and 6, and the second sun gear 2 to the second shaft 2 which is thus turned in the same direction as shown in FIG. 7. Moreover, the controller 14 provides the drive circuit 10a with a command signal for driving the differential electric motor 10 of which the rotating action is transmitted via the drive gear 9 and the external toothed member 8 to the carrier 7 which in turn rotates to turn the first and second planetary gears 5 and 6 and the second sun gear 4 and thus increase the rotational speed of the second shaft 2. When the steering torque applied to the first shaft 1 is deviated from its correct level due to the increase in the rotational speed of the second shaft 2, the controller 14 supplies the drive circuit 13a with a command signal for driving the reaction force electric motor 13 in response to a torque applied to the second shaft 2 or the like. Thereby a reaction force torque, for example, in the same direction as the rotational direction of the first shaft 1, is applied to the first shaft 1, thus returning its steering torque to the correct level.

Embodiment 2

Figure 9:
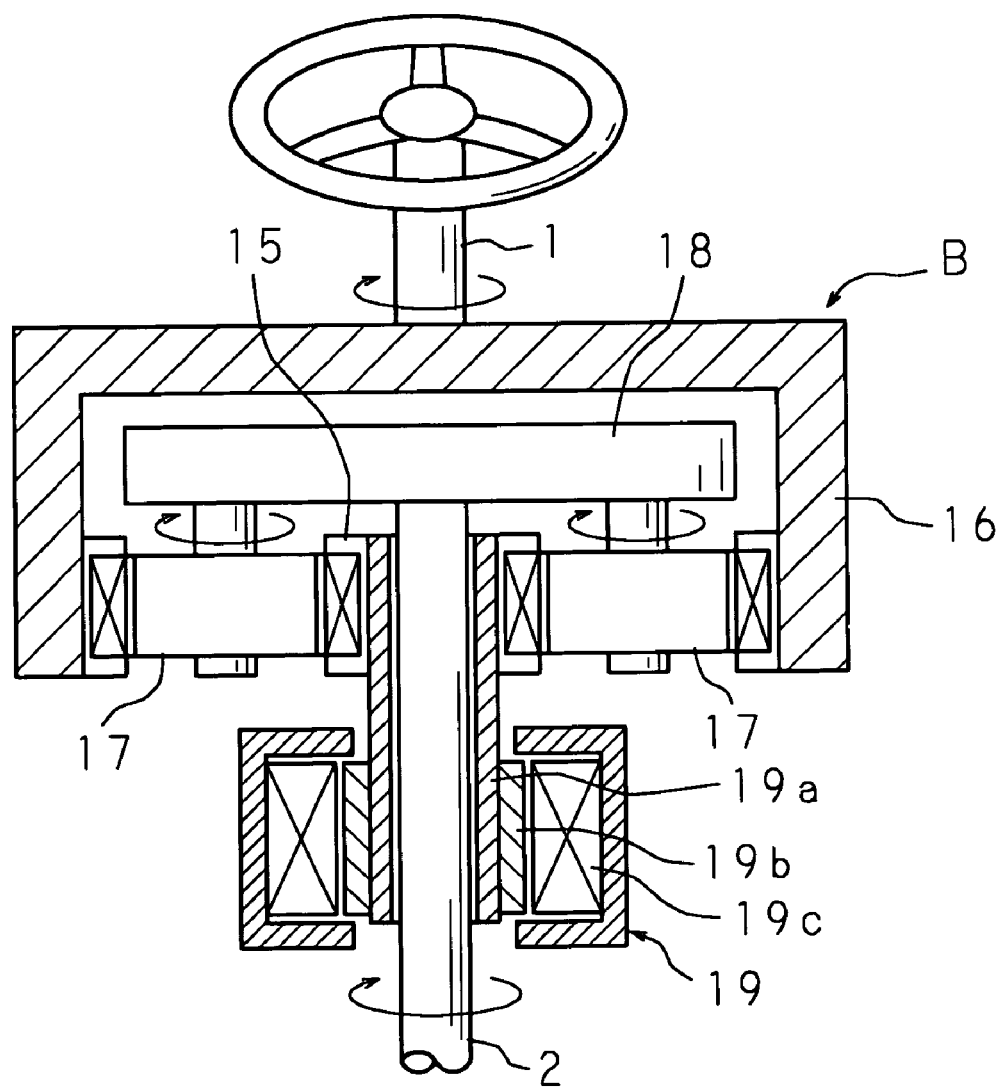
FIG. 9 is a schematic view showing a construction of a rotation transmitting apparatus according to Embodiment 2 of the present invention.

FIG. 9 is a schematic view showing a construction of a rotation transmitting apparatus according to Embodiment 2 of the present invention. The rotation transmitting apparatus comprises a differential gears mechanism B which includes a first shaft 1 and a second shaft 2 arranged coaxially so as to be freely rotatable, a sun gear 15 rotatably fitted and mounted on the second shaft 2, an internal gear 16 arranged on the periphery of the sun gear 15 so as to be freely rotatable and coupled to the first shaft 1 coaxially so as to rotate interlockingly, a plurality of planetary gears 17 meshed with the sun gear 15 and the internal gear 16, and a carrier 18 supporting the planetary gears 17 and coupled with the second shaft 2 coaxially so as to rotate interlockingly and a differential electric motor 19 as an actuator arranged on the periphery of the second shaft 2. A cylindrical rotor 19a of the differential electric motor 19 is joined to the sun gear 15 coaxially so as to rotate interlockingly.

In Embodiment 2, the internal gear 16 is formed in a cylindrical bottomed shape having a set of teeth mounted on the inner side thereof. The first shaft 1 is coupled in the center of the bottom of the internal gear 16. The sun gear 15 is formed integral with the rotor 19a as a movable portion, and a permanent magnet 19b is mounted on the outer surface of the rotor 19a and is surrounded by a stator 19c of the electric motor 19. The carrier 18 is formed in a disk shape. A pair of the planetary gears 17 are symmetrically mounted at two deflected locations from the center of the carrier 18.

The sun gear 15, the internal gear 16, and the planetary gears 17 in the differential gears mechanism B are constituted of spur gears. It is assumed that the number of teeth Z5 of the sun gear 15 is 11 while the number of teeth Z6 of the internal gear 16 is 45. When the rotating motion of the first shaft 1 is transmitted to the second shaft 2, the ratio of the torque applied to the second shaft 2 to the torque applied to the first shaft 1 is calculated from:

Z6/(Z6+Z5).

Similar to that of Embodiment 1, the torque ratio is set to range from 1:0.7 to 1:0.9, which can obtain an optimal characteristic from the four characteristics shown in FIGS. 3 to 6.

In the action of Embodiment 2, when the first shaft 1 is turned by the action of the steering wheel, its movement is transmitted via the internal gear 16, the planetary gears 17, and the carrier 18 to the second shaft 2. Moreover, the controller provides the drive circuit with a command signal for driving the differential electric motor 19 of which the rotating action is transmitted via the sun gear 15 and the planetary gears 17 to the carrier 18 which in turn rotates to increase the rotational speed of the second shaft 2.

Although a reaction force electric motor is not illustrated in Embodiment 2, another structure may also be employed for Embodiment 2 in which the transmission gear is provided in the middle of the first shaft 1 as in Embodiment 1, and a reaction force electric motor having a drive gear meshing with the transmission gear are provided, and applying a required torque force to the first shaft 1 in response to a torque which has been applied to the second shaft 2 when the steering torque applied to the first shaft 1 is deviated from its correct steering torque.

The other arrangements and actions are identical to those of Embodiment 1 and will be described in no more detail while like components are denoted by like numeral.

Embodiment 3

Figure 10:
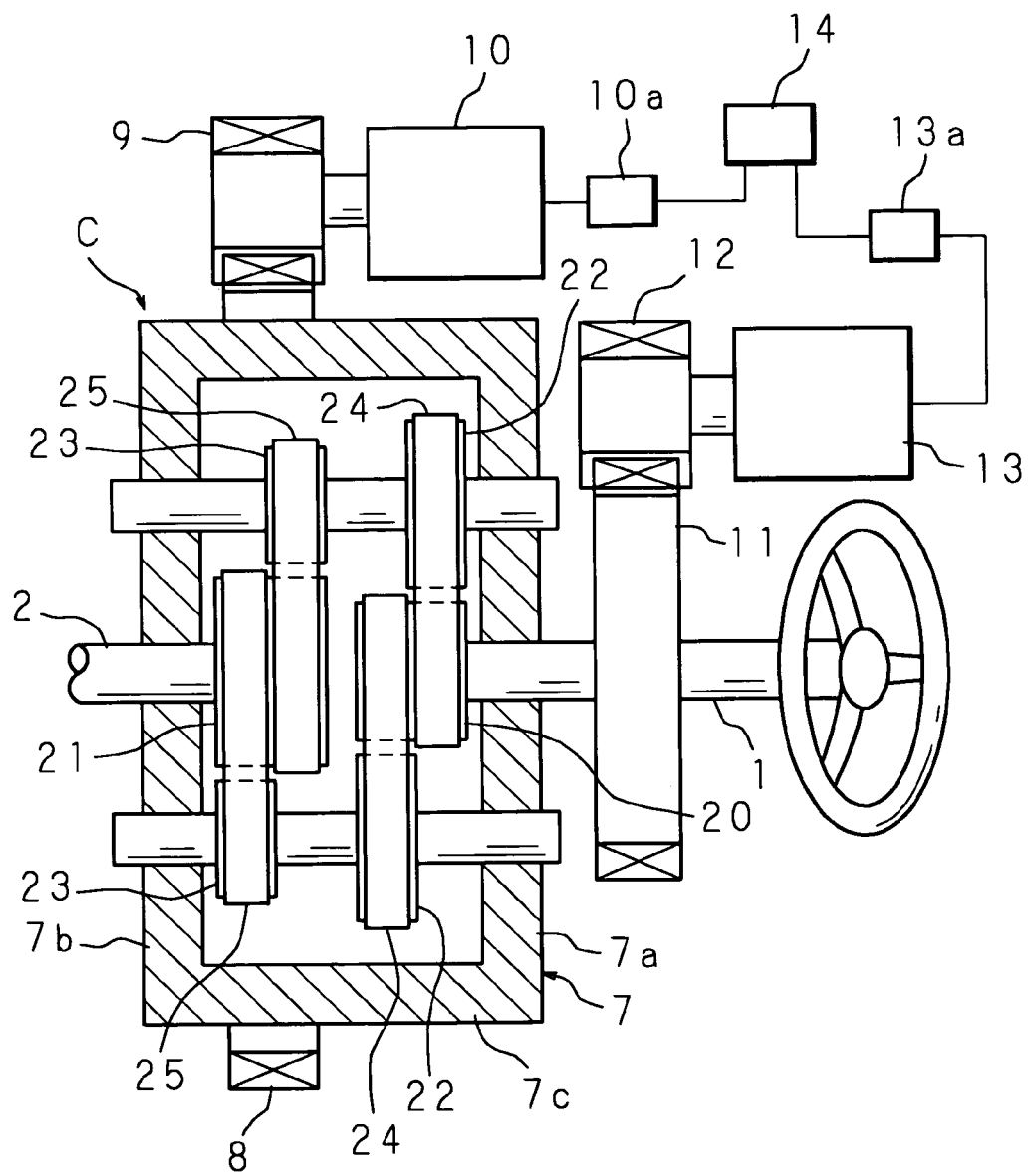
FIG. 10 is a schematic view showing a construction of a rotation transmitting apparatus according to Embodiment 3 of the present invention.

FIG. 10 is a schematic view showing a construction of a rotation transmitting apparatus according to Embodiment 3 of the present invention. The rotation transmitting apparatus comprises a differential mechanism C having no gear in place of the differential gears mechanism A. The rotation transmitting apparatus comprises the differential mechanism C which includes two, first and second, sun pulleys 20 and 21 corresponding to the first and second sun gears 3 and 4, two, first and second, planetary pulleys 22 and 23 corresponding to the first and second planetary gears 5 and 6, a first transmission belt 24 mounted between the first sun pulley 20 and the first planetary pulley 22, a second transmission belt 25 mounted between the second sun pulley 21 and the second planetary pulley 23, and a carrier 7 arranged rotatably supporting the first and second planetary pulleys 22 and 23, a differential electric motor 10 provided as an actuator for driving the rotating motion of the carrier 7, and a reaction force electric motor 13 provided as an actuator for applying a required torque to the first shaft 1 in response to the torque applied to the second shaft 2 when the steering torque applied to the first shaft 1 is deviated from its correct level.

In Embodiment 3, the first sun pulley 20 is joined coaxially with the first shaft 1 so as to rotate interlockingly while the second sun pulley 21 is joined coaxially with the second shaft 2 so as to rotate interlockingly. The two, first and second, planetary pulleys 22 and 23 are integrally mounted on the same shaft.

When the outer diameter of the first sun pulley 20 is D1, the outer diameter of the first planetary pulley 22 is D2, the outer diameter of the second planetary pulley 23 is D3, and the outer diameter of the second sun pulley 21 is D4, the ratio of the torque applied to the second shaft 2 to the torque applied to the first shaft 1 during transmission of the rotating motion from the first shaft 1 to the second shaft 2 is calculated from:

(D1÷D2)×(D3÷D4).

In particular, the torque ratio is set to range from 1:0.7 to 1:0.9, which can obtain an optimal characteristic from the four characteristics shown in FIGS. 3 to 6.

In the action of Embodiment 3, when the first shaft 1 is turned, its movement is transmitted via the first sun pulley 20, the first and second planetary pulleys 22 and 23, and the second sun pulley 21 to the second shaft 2 which is thus turned. Moreover, the controller 14 provides the drive circuit 10a with a command signal for driving the differential electric motor 10 of which the rotating action is transmitted via the drive gear 9 and the external toothed member 8 to the carrier 7 which in turn rotates to turn the first and second planetary pulleys 22 and 23 and the second sun pulley 21 and thus increase the rotational speed of the second shaft 2. When the steering torque applied to the first shaft 1 is deviated from its correct level due to the increase in the rotational speed of the second shaft 2 or the like, the controller 14 supplies the drive circuit 13a with a command signal for driving the reaction force electric motor 13 in response to a torque applied to the second shaft 2 or the like. Thereby a reaction force torque, for example, in the same direction as the rotational direction of the first shaft 1, is applied to the first shaft 1, thus returning its steering torque to the correct level.

The other arrangements and actions are identical to those of Embodiment 1 and will be described in no more detail while like components are denoted by like numeral.

The electric motors 10 and 13 are used as the actuators for the differential and the counter action in the above embodiments but intended not to be so limited.

While both the differential electric motor 10 and the reaction force electric motor 13 are employed (as the actuators) in the above embodiments, the reaction force electric motor 13 may be eliminated if not needed.

Although the differential electric motor 10 is arranged for rotating the carrier 7 in Embodiment 1, it may rotate directly the second shaft 2.

In Embodiment 2, the differential electric motor 19 is arranged for driving the sun gear 15 with the first shaft 1 joined to the internal gear 16 and the second shaft 2 joined to the carrier 18 so as to rotate interlockingly. Alternatively, while the first shaft 1 is joined with the sun gear 15, the carrier 18 may be joined to the rotator 19a of the differential electric motor 19 so as to rotate interlockingly and driven by the differential electric motor 19. Also, while the first shaft 1 is joined with the carrier 18 so as to rotate interlockingly and the second shaft 2 is joined with the sun gear 15, the internal gear 16 may be joined to the rotator 19a of the differential electric motor 19 so as to rotate interlockingly and driven by the differential electric motor 19. Moreover, while the first shaft 1 is joined with the sun gear 15 and the second shaft 2 is joined with the carrier 18, the internal gear 16 may be joined to the rotator 19a of the differential electric motor 19 so as to rotate interlockingly and driven by the differential electric motor 19.

Although flat belts are used as the transmission belts in Embodiment 3, V belts, toothed belts, or the like may also be used.

As the present invention may be embodied in several forms without departing from the spirit of essential characteristics thereof, the foregoing embodiments are therefore illustrative and not restrictive, since the scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. A steering apparatus comprising:
 a rotation transmitting apparatus for transmitting an operation of a steering wheel of a vehicle to a steering mechanism, the transmitting apparatus including:
 a differential mechanism having a first shaft and a second shaft arranged so as to be freely rotatable and linked with each other so as to rotate interlockingly, the first shaft being at a steering wheel side, and the second shaft being at a steering mechanism side; and
 a first electric motor for driving a part of the differential mechanism,
 wherein the differential mechanism is arranged to have a torque ratio (T2/T1) of a torque (T2) applied to the second shaft to a torque (T1) applied to the first shaft ranging from 1/0.7 to 1/0.9, and
 wherein the differential mechanism includes a first sun gear joined to the first shaft so as to rotate interlockingly, a second sun gear joined to the second shaft so as to rotate interlockingly, a first planetary gear meshed with the first sun gear, a second planetary gear rotating with the first planetary gear and meshed with the second sun gear, and a carrier supporting the first and second planetary gears and arranged to be driven by the first electric motor, wherein the number of teeth of each of the first and second sun gears and the first and second planetary gears is determined so as to satisfy the torque ratio.

2. The steering apparatus according to claim 1, further comprising:
 a second electric motor for applying a desired torque to the first shah in response to the torque applied to the second shaft.

3. The steering apparatus according to claim 1, further comprising the steering wheel connected to the first shaft.

4. A steering apparatus comprising:
 a rotation transmitting apparatus for transmitting an operation of a steering wheel of a vehicle to a steering mechanism, the rotation transmitting apparatus including:
 a differential mechanism having a first shaft and a second shaft arranged so as to be freely rotatable and linked with each other so as to rotate interlockingly, the first shaft being at a steering wheel side, and the second shaft being at a steering mechanism side; and
 a first electric motor for driving a part of the differential mechanism,
 wherein the differential mechanism is arranged to have a torque ratio (T2/T1) of a torque (T2) applied to the second shaft to a torque (T1) applied to the First shaft ranging from 1/0.7 to 1/0.9, and
 wherein the differential mechanism includes a first sun gear joined to the first shaft so as to rotate interlockingly, a second sun gear joined to the second shaft so as to rotate interlockingly, a first planetary gear meshed with the first sun gear, a second planetary gear rotating with the first planetary gear and meshed with the second sun gear, and a carrier supporting the first and second planetary gears and arranged to be driven by the first electric motor, wherein the number of teeth of each of the first and second sun gears and the first and second planetary gears is determined so as to satisfy the torque ratio, and
 wherein the torque ratio is obtained from the following formula:

$$(Z1/Z2) \times (Z3/Z4),$$

where Z1 is the number of teeth of the first sun gear, Z2 is the number of teeth of the first planetary gear, Z3 is the number of teeth of second planetary gear, and Z4 is the number of teeth of the second sun gear.

5. The steering apparatus according to claim 4, further comprising:
 a second electric motor for applying a desired torque to the first shaft in response to the torque applied to the second shaft.

6. The steering apparatus according to claim 4, further comprising the steering wheel connected to the first shaft.

7. A steering apparatus comprising:
 a rotation transmitting apparatus for transmitting an operation of a steering wheel of a vehicle to a steering mechanism, the transmitting apparatus including:
 a differential mechanism having a first shaft and a second shaft arranged so as to be freely rotatable and linked with each other so as to rotate interlockingly, the first shaft being at a steering wheel side, and the second shaft being at a steering mechanism side;
 a first electric motor for driving a part of the differential mechanism, the differential mechanism being arranged to have a torque ratio (T2/T1) of a torque (T2) applied to the second shaft to a torque (T1) applied to the first shaft ranging from 1/0.7 to 1/0.9; and
 a second electric motor for applying a desired torque to the first shaft in response to the torque applied to the second shaft.

8. The steering apparatus according to claim 7, wherein the differential mechanism includes a sun gear arranged so as to be freely rotatable, an internal gear arranged on the periphery of the sun gear so as to be freely rotatable, planetary gears meshed with both the sun gear and the internal gear, and a carrier supporting the planetary gears, wherein one of the sun gear, the internal gear, and the carrier is joined to the first shaft so as to rotate interlockingly, another is joined to the second shaft so as to rotate interlockingly, and the other is joined to a movable portion of the first electric motor so as to rotate interlockingly while the number of teeth of each of the sun gear, the internal gear, and the planetary gears is determined so as to satisfy the torque ratio.

9. The steering apparatus according to claim 7, further comprising the steering wheel connected to the first shaft.

* * * * *